(12) United States Patent
Ward

(10) Patent No.: US 8,706,573 B2
(45) Date of Patent: Apr. 22, 2014

(54) INVENTORYING COMMUNICATION CIRCUITS

(75) Inventor: Jonathan Ward, Roswell, GA (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 1919 days.

(21) Appl. No.: 11/704,069

(22) Filed: Feb. 8, 2007

(65) Prior Publication Data

US 2008/0013694 A1 Jan. 17, 2008

Related U.S. Application Data

(60) Provisional application No. 60/830,391, filed on Jul. 12, 2006.

(51) Int. Cl.
*G06Q 10/00* (2012.01)

(52) U.S. Cl.
USPC .............. 705/28; 705/7.14; 705/26.9; 705/29

(58) Field of Classification Search
None
See application file for complete search history.

(56) References Cited

U.S. PATENT DOCUMENTS

| 4,456,790 | A | * | 6/1984 | Soyack | 379/102.01 |
| 5,650,994 | A | * | 7/1997 | Daley | 370/259 |
| 5,790,548 | A | * | 8/1998 | Sistanizadeh et al. | 370/401 |
| 6,091,735 | A | * | 7/2000 | Dodson et al. | 370/420 |
| 2004/0203439 | A1 | * | 10/2004 | Zerressen | 455/67.11 |
| 2006/0181420 | A1 | * | 8/2006 | Ishii | 340/572.1 |
| 2006/0215636 | A1 | * | 9/2006 | Corley et al. | 370/401 |

* cited by examiner

*Primary Examiner* — Fateh Obaid
(74) *Attorney, Agent, or Firm* — Hanley, Flight & Zimmerman, LLC

(57) ABSTRACT

Inventorying communications circuits may be provided. Consistent with embodiments of the present invention, systems and methods are disclosed for inventorying communication circuits. A calculation may provide a facility requirement value corresponding to a required number of service pair to serve a location with a predetermined service quality. Then, it may be determined that an available plurality of service pairs equal to the facility requirement value is available from a switching center to the location. Next, a circuit tag may be created corresponding to the available plurality of service pair. A plurality of service tags may then be created. Each the plurality of service tags may respectively correspond to each of the available plurality of service pair. The plurality of service tags may be sequentially numbered. Then, the circuit tag and the plurality of the service tags may be stored in an inventory database.

20 Claims, 3 Drawing Sheets ately corresponds to each of the available of service pair. The
INVENTORYING COMMUNICATION CIRCUITS

RELATED APPLICATION

Under provisions of 35 U.S.C. §119(e), Applicant claims the benefit of U.S. provisional application No. 60/830,391, filed Jul. 12, 2006, entitled "Mid-Band Ethernet", which is incorporated herein by reference.

BACKGROUND

Service providers may provide data services, such as Ethernet data services, to users. To provide data services, the service providers may use service pair comprising, for example, multiple copper wire or optical fiber strands. In some situations, many service pairs may be available in one large cable or cables from which the service providers may select a subset to serve the user. For example, a 200 pair cable may leave a switching center from which eight pairs may be available at a user's location. Consequently, the service providers, to provide data services to the user, may use multiple pairs that may be available at the user's location. This often causes problems because the conventional strategy does not provide a scheme for inventorying more than the two pairs within the large cable when more than the two pairs are used to provide Ethernet based data services to the user's location.

SUMMARY OF THE INVENTION

Consistent with embodiments of the present invention, systems and methods are disclosed for inventorying communication circuits. A calculation may provide a facility requirement value corresponding to a required number of service pairs to serve a location with a predetermined service quality. A data speed requirement, a type of service, for example Ethernet, or a quality of service requirement may represent the predetermined service quality. Then, it may be determined that an available plurality of service pair equal to the facility requirement value is available from a switching center to the location. Next, a circuit tag may be created corresponding to the available plurality of service pair. A plurality of service tags may then be created. Each of the service tags may respectively corresponds to each of the available of service pair. The plurality of service tags may be sequential and each service tag may form a linked group of tags by concatenating the circuit tag with each service tag. Then, the circuit tag and the plurality of the service tags may be stored in an inventory database.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
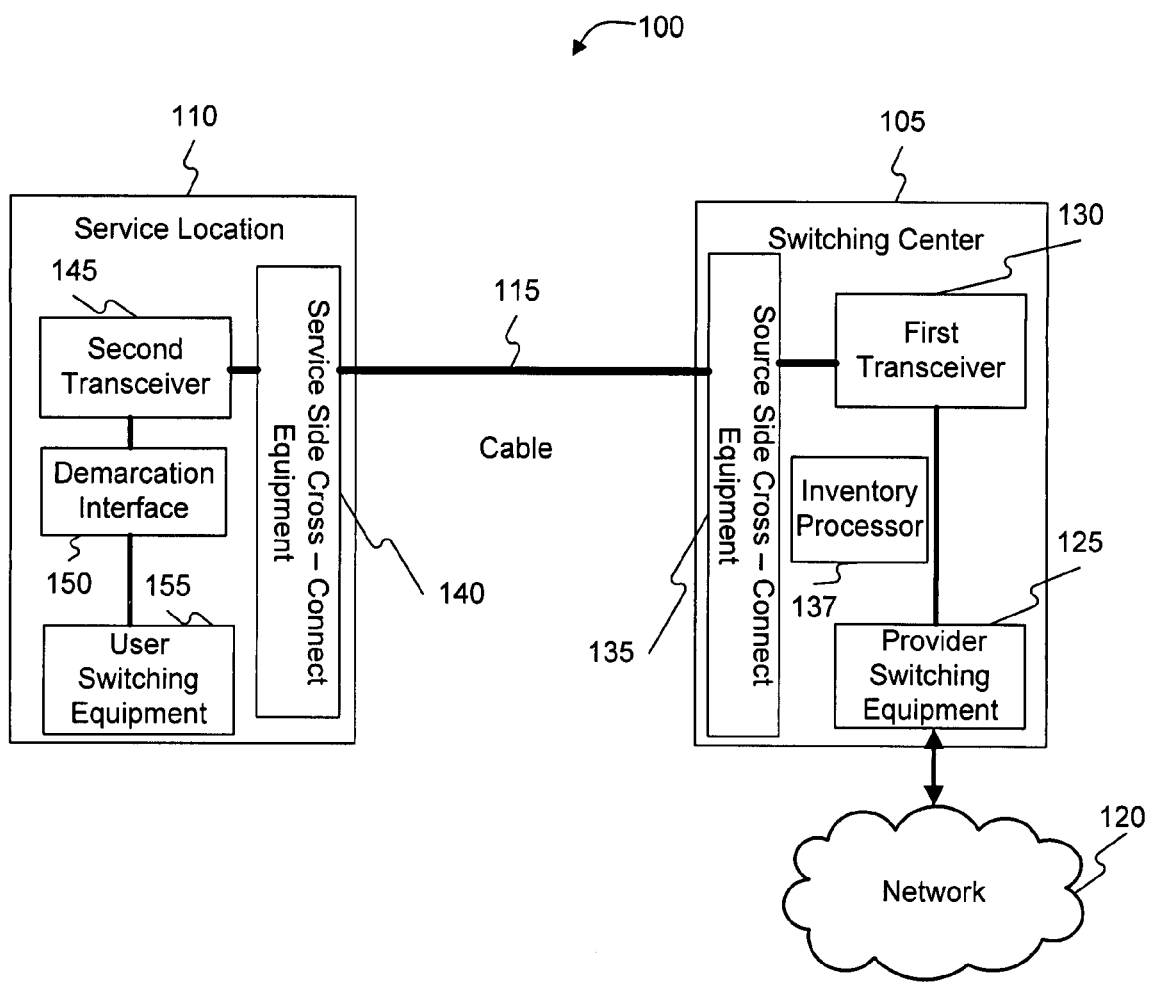
FIG. 1 is a block diagram of communication system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A service provider may provide data services, such as Ethernet data services, to a user. To provide data services, the service provider may use service pair comprising, for example, multiple copper wire pair or optical fiber strands. In some situations, many service pair may be available in one large cable or cables from which the service provider may select a subset to serve the user. For example, a 200 pair cable may leave the service provider's switching center from which eight pairs may be available at the user's location. To provide the user with data services, the service provider may use multiple pairs available at the user's location. The pairs collectively used to provide data services may be considered to be one communication circuit by the service provider.

Consistent with embodiments of the invention, communication circuits may be inventoried. For example, the service provider may receive a request from the user for a predetermined service quality such as, for example, a specific service type or a speed of data. Based on a distance, for example, the distance between the switching center and the user's service location, and on the user's predetermined service quality, the service provider may calculate how many service pairs may be used to serve the user's service location. For example, the service provider may determine that six pairs are required to serve the service location with Ethernet data. The service provider may consider the six pairs collectively as one circuit. To inventory the circuit, the service provider may create a circuit tag identifying the circuit. To inventory each of the pairs within the circuit and within the cable, the service provider may create a service tag for each pair. After creating the set of tags, the service provider may store the tags in an inventory system or in other databases and systems.

FIG. 1 is a block diagram of a communication system 100. Consistent with embodiments of the present invention, system 100 may comprise a switching center 105, a service location 110, a cable 115, and a network 120. Switching center 105 may comprise provider switching equipment 125, a first transceiver 130, source side cross-connect equipment 135, and an inventory processor 137. Inventory processor 137 is discussed in greater detail below with respect to FIG. 2.

Switching center 105 may comprise for example, a subscriber-loop-control system interfaced to a switched telephone network (e.g. network 120). The subscriber-loop-control system may be connected to an individual telephone network user (e.g. service location 110). Switching center 105 may contain components to provide, for example, Ethernet data service over existing cable facilities (e.g. Mid-Band Ethernet) to the telephone network user. Switching center 105 may comprise, but is not limited to, a telephone central office or a field switching center. The field switching center may be, for example, an environmentally controlled cabinet wherein a switching system is located. The switching system may include, for example, the subscriber-loop-control system, a fiber-in-the-loop system, a passive optical network system, a gateway interface, a digital subscriber line access multiplexer, an integrated digital loop carrier system, a universal digital loop carrier system, a remote terminal, a remote digital terminal, an optical network unit, or a short-loop subscriber-line interface control. The aforementioned are examples and switching center 105 may comprise other configurations for data switching.

Provider switching equipment 125 may comprise any network switching device. For example, provider switching equipment 125 may comprise an Ethernet switch for a local area network (LAN), a wide area network (WAN), or a wireless local area network (WLAN). Provider switching equipment 125 may allow services including, for example, Voice-Over IP (VOIP), layer 3 VPN service and dedicated Internet access right behind it before virtual LAN, virtual LAN (VLAN), generic attribute registration protocol (GARP). For example, provider switching equipment 125 may comprise a Cisco 3750 data switch or a Cisco 7609 data switch (Cisco Systems, Inc. of San Jose, Calif.). Furthermore, provider switching equipment 125 may operate on copper cable or fiber networks.

First transceiver 130 may comprise, for example, equipment to deliver data service to users over copper wire or fiber optic pair. First transceiver 130 may comprise one component or multiple components. First transceiver 130 may include, for example, an optical transceiver or an IEEE Ethernet OAM capable transceiver. First transceiver 130 may transmit and receive Ethernet data service over copper wire or fiber optic cable to service location 110. For example first transceiver 130 may comprise a Hatteras HN 418U transceiver (Hatteras Networks, Inc. of Research Triangle Park, N.C.) and a Canoga Perkins Optical Transceiver (Canoga Perkins, Inc. of Chatsworth, Calif.) interconnected by a fiber optic cable. In addition, first transceiver 130 may comprise one component, for example, the Hatteras HN 418 U transceiver.

Source side cross-connect equipment 135 may comprise a cross-connect block used to interface between cable 115 and first transceiver 130. Source side cross-connect equipment 135 may be larger than service side cross-connect equipment 140. Source side cross-connect equipment 135 may comprise a 112-type connecting block, a 89-type connecting block, a 78-type connecting block, a cable termination, a cable wire trough, and a surge protection block. The aforementioned are examples and source side cross-connect equipment 135 may comprise other connecting blocks.

Service location 110 may comprise a service side cross-connect equipment 140, a second transceiver 145, a demarcation interface 150, and a user switching equipment 155. Service location 110 may comprise a location having an internal Ethernet network, interconnected to a service provider's external data service, for example. Service location 110 may be located in a residence, a commercial building, an educational campus, an industrial campus, or any other location. Service location 110 may contain all the components in order to receive Ethernet data service over existing cable facilities of a telephone network.

Service side cross-connect equipment 140 may comprise a cross-connect block used to interface cable 115 and second transceiver 145. Service side cross-connect equipment 140 may comprise a 66-type block, a 110-type block, a cable termination, a cable wire trough, and a surge protection block. The aforementioned are examples, and service side cross-connect equipment 140 may comprise other block types. Service side cross-connect equipment 140 may be smaller than source side cross-connect equipment 135.

Second transceiver 145 may comprise equipment used to receive, for example, data service at service location 110 from the service provider's external data service, over copper wire or fiber optic pair. Like, first transceiver 130, second transceiver 145 may comprise one component or multiple components. Second transceiver 145 may include for example, an optical transceiver or an IEEE Ethernet OAM capable transceiver. Second transceiver 145 may transmit and receive, for example, Ethernet data service over copper wire or fiber optic cable from switching center 105. For example second transceiver 145 may comprise a Hatteras HN 418U transceiver (Hatteras Networks, Inc. of Research Triangle Park, N.C.) and a Conoga Perkins Optical Transceiver (Canoga Perkins, Inc. of Chatsworth, Calif.) interconnected by a fiber optic cable. In addition, second transceiver 145 may comprise one component, for example, the Hatteras HN 418 U transceiver.

Demarcation interface 150 may comprise a passive electrical demarcation device or network interface device. Demarcation interface 150 may interconnect a multi-pair copper cable, a 10/100/1000 base T Ethernet cable, or a fiber optic cable. For example, demarcation interface 150 may be an RJ-45 jack. Demarcation interface 150 may be a dividing line between user owned equipment and service provider owned equipment.

User switching equipment 155 may comprise any network switching device. For example, like provider switching equipment 125, user switching equipment 155 may comprise the Ethernet switch for the local area network (LAN), the wide area network (WAN), or the wireless local area network (WLAN). User switching equipment 155 may allow services including, for example, Voice-Over IP (VOIP), layer 3 VPN service and dedicated Internet access right behind it before virtual LAN, virtual LAN (VLAN), generic attribute registration protocol (GARP). Furthermore, user switching equipment 155 may operate, for example, on copper cable, fiber networks, or wireless networks. For example, user switching equipment 155 may comprise the following: i) the Cisco 3750 switch; ii) the Cisco 7609 switch; iii) a wireless home network switch; iv) an Ethernet switch; or v) a personal computer LAN controller. (Cisco switching products from Cisco Systems, Inc. of San Jose, Calif.) The aforementioned are examples and types of switches may be used.

Cable 115 may comprise, for example, the multi-pair copper cable, a single mode fiber cable, and a multimode fiber cable. Cable 115 may interconnect switching center 105 and service location 110. Cable 115 may carry network services, data services, video services, and telephone services. For example, cable 115 may comprise the following: i) a cable including a plurality of twisted-pair; ii) a 10-Base T cable; iii) a 100-Base T cable; iv) a 1000-Base T cable; v) a CAT-3 cable; vi) a CAT-4 cable; vii) a CAT-5 cable; viii) a CAT-6 cable; or ix) a fiber optic cable comprising multimode, single-mode, or a combination of multimode and single-mode fiber optics. The aforementioned are examples and cable 115 may comprise other cable types.

Network 120 may comprise any switched telecommunications network configured to data services. Network 120 may comprise a public switched telephone network (PSTN), an Internet network, and an Intranet network. Furthermore, network 120 may comprise switches, routers, gateways, private branch exchanges (PBX), wires, interfaces, and other connections. Network 120 may deliver data in Ethernet, synchronous optical transmission (SONET), asynchronous transfer mode (ATM), and other network protocols. In other words, network 120 may comprise a common network for the exchange of data.

An embodiment consistent with the invention may comprise a system for inventorying circuits. The system may comprise a memory storage for maintaining a database and a processing unit coupled to the memory storage. The processing unit may be operative to calculate a facility requirement value corresponding to a required number of service pair required to serve a location with a predetermined service quality. In addition, the processing unit may be operative to determine that an available plurality of service pair equal to the facility requirement value are available to the location and to create a circuit tag corresponding to the available plurality of service pair. Furthermore, the processing unit may be operative to create a plurality of service tags. Each of the plurality of service tags may respectively correspond to each of the available plurality of service pair. The plurality of service tags may be sequential. In addition, the processing unit may be operative to store the circuit tag and the plurality of the service tags in an inventory database.

Consistent with an embodiment of the present invention, the aforementioned memory, processing unit, and other components may be implemented in a communication system, such as communication system 100 of FIG. 1. Any suitable combination of hardware, software, and/or firmware may be used to implement the memory, processing unit, or other components. By way of example, the memory, processing unit, or other components may be implemented with inventory processor 137, in combination with system 100. The aforementioned system and processors are examples and other systems and processors may comprise the aforementioned memory, processing unit, or other components, consistent with embodiments of the present invention.

Figure 2:
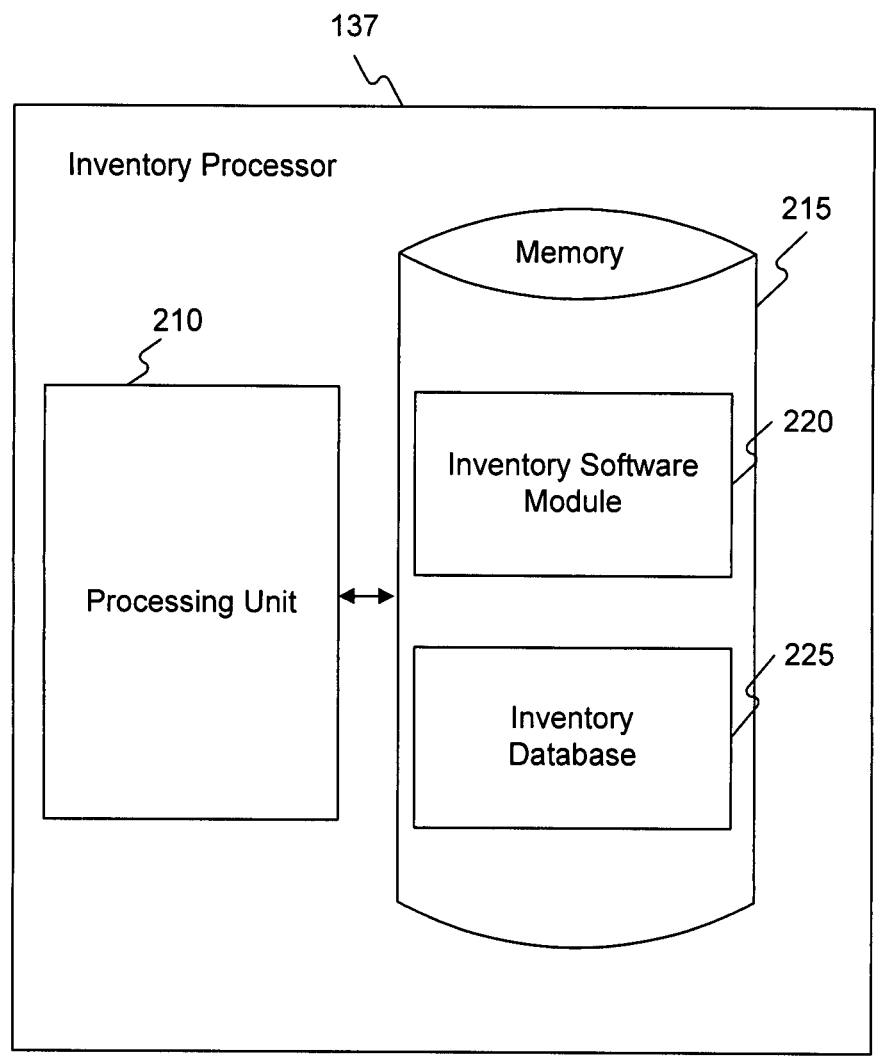
FIG. 2 is block diagram of an inventory processor.

FIG. 2 shows inventory processor 137 of FIG. 1 in more detail. As shown in FIG. 2, inventory processor 137 may include a processing unit 210 and a memory 215. Memory 215 may include an inventory software module 220 and an inventory database 225. While executing on processing unit 210, inventory software module 220 may perform processes for inventorying circuits, including, for example, one or more of the stages of method 300 described below with respect to FIG. 3. Furthermore, any combination of inventory software module 220 and inventory database 225 may be executed on or reside in any one or more of the elements shown in FIG. 1.

Inventory processor 137 ("the processor") may be implemented using a personal computer, network computer, mainframe, or other similar microcomputer-based workstation. Inventory Processor 137 may be implemented in switching center 105 or in any other location. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a WiFi access point, or a facsimile machine. The aforementioned systems and devices are examples and the processor may comprise other systems or devices.

Figure 3:
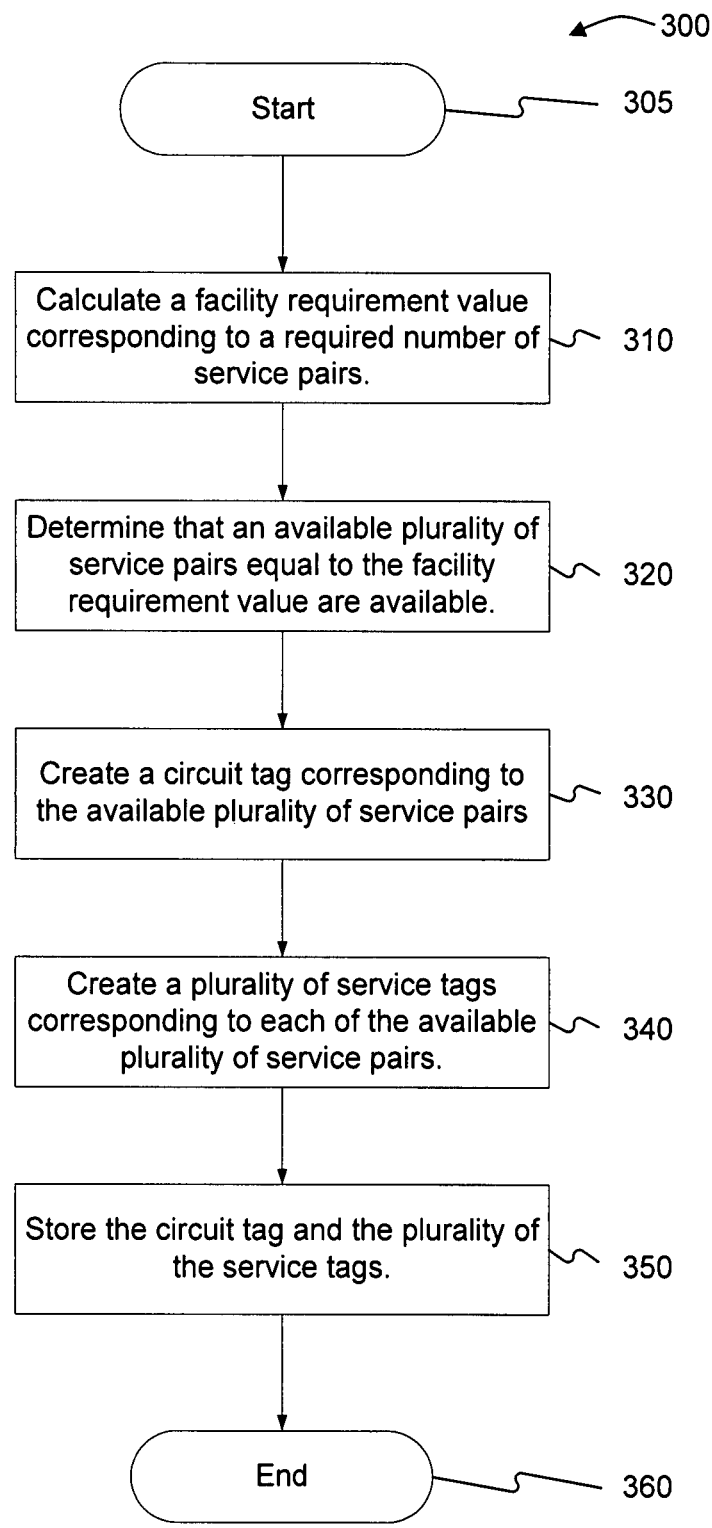
FIG. 3 is a flow chart of a method for inventorying communications circuits.

FIG. 3 is a flow chart setting forth the general stages involved in a method 300 consistent with an embodiment of the invention for inventorying communications circuits. Method 300 may be implemented using processing unit 210 within inventory processor 137, as described in more detail with respect to FIG. 2. Ways to implement the stages of method 300 will be described in greater detail below. Method 300 may begin at starting block 305 and proceed to stage 310 where inventory processor 137 may calculate a facility requirement value corresponding to a required number of service pair. For example, a data service to service location 110 may require a calculable number of service pair to provide a requested data service type and a requested data speed. Inventory processor 137 may receive a request for the data service type through, for example, a service order request. The request may contain a predetermined service quality such as, for example, the data service type and the data speed. The predetermined service quality may be identified in the request for the data service, for example, in the service order, and may include the following factors: i) a location of switching center 105; ii) a location of service location 110; iii) a distance of cable 115; iv) the requested data speed; v) a quality of service requirement; and vi) a data service type. The aforementioned are examples and the predetermined service quality may include other determining factors.

Inventory processor 137 may get the request specifying, for example, Ethernet data service at a speed equal to 6 Mb/second to service location 110. The service order may contain other relevant information, for example, an address, a map location, a date, and a telephone number. From this information, switching center 105 may be determined from a plurality of switching centers. Switching center 105 may be the switching center that is geographically closest to the service location. Furthermore, the distance of cable 115 between switching center 105 and service location 110, may determine the closest switching center. Switching center 105 may serve the predetermined service quality to service location 110 upon proper configuration. For example, switching center 105 may already contain the appropriate equipment to provide the predetermined service quality to service location 105. Switching center 105 may, however, require new or upgraded equipment. A different switching center may serve service location 110, if the closest switching center is not configurable.

After switching center 105 is determined from the plurality of switching centers, inventory processor 137 may use a rate and a reach to calculate a facility requirement value. The rate and the reach may provide the facility requirement value based, for example, on the predetermined service quality. The facility requirement value is a number of service pair in cable 115, as specified by the rate and the reach, determined to produce the predetermined service quality. The determination, using the rate and the reach, may specify the number of the service pair in cable 115, for a type of service, for example Ethernet over copper, at an expected data speed. The rate may be the data speed, as defined in the predefined service quality, and the reach may be the distance of cable 115. For example, if service location 110 is 10,000 feet from switching center 105, and the service order requests 6 Mb/second of Ethernet service, the rate and the reach may specify the facility requirement value of eight pair of service pair in cable 115. Table 1 shows an example of the rate and the reach.

TABLE 1

| Reach | Rate | | | |
|---|---|---|---|---|
| | 2 Mb/Sec of Ethernet Speed | 4 Mb/Sec of Ethernet Speed | 6 Mb/Sec of Ethernet Speed | 8 Mb/Sec of Ethernet Speed |
| 0 feet to 5,000 feet | 2 pair | 4 pair | 6 pair | 8 pair |
| 5,001 feet to 10,000 feet | 4 pair | 6 pair | 8 Pair | 10 pair |
| 10,001 feet to 15,000 feet | 6 pair | 8 pair | 10 Pair | N/A |
| 15,001 feet to 20,000 feet | 8 pair | 10 pair | N/A | N/A |

From stage 310, where inventory processor 137 may calculate the facility requirement value corresponding to the required number of service pair, method 300 may advance to stage 320 where inventory processor 137 may determine an available plurality of service pair equal to the facility requirement value are available. For example, inventory processor 137 may determine that the availability of the available plurality of service pair by referencing a cable status system. The cable status system may be a database or a system that tracks the status of the service pair within cable 115. The available plurality of service pair, corresponding to available pairs of service within cable 115, may be available if the pairs of service within cable 115 are unused. For example, after calculating the facility requirement value to serve service location 110 is equal to eight pair, the available pairs of service within cable 115, equal to eight pair, may be unused. The available pairs of service within cable 115 equal to the facility requirement value, however, may not be unused and hence may not be available. The lack of unused service pair within cable 115 may require additional action, for example, requesting an installation of a new cable 115 or requesting the release of currently used pairs within cable 115. The additional action may change the status of availability for the plurality of available service pair upon completion. Furthermore, inventory processor 137 may classify pairs of service within cable 115 as incompatible or nonfunctioning and therefore as unavailable. The cable status system may note the incompatible or nonfunctioning pairs of service within cable 115.

Inventory processor 137 may use other processes for determining the available plurality of service pair are available. For example, inventory processor 137 may make a request to a technician to determine the availability of the available plurality of service pair. In addition, inventory processor 137 may access another application, for example, a map program, to determine the availability of the available plurality of service pair. The aforementioned are examples and other processes for determining the availability of the available plurality of service pair may apply.

Inventory processor 137 may determine the availability of the available plurality of service pair by determining that the available plurality of service pair are qualified. A qualified service pair may be an unused service pair within cable 115. In addition, the qualified service pair may be a tested service pair within cable 115. A field technician, an automated test system, or a documented previously tested service pair may satisfy the testing requirement. Furthermore, the qualified service pair may be a bonded service pair, where the available plurality of the service pair, equal in number to the facility requirement value, are bonded together within cable 115. For example, after inventory processor 137 determines that eight pair of service within cable 115 are available, inventory processor 137 may access the database and determine that the eight service pair have previously passed a testing routine. Furthermore, inventory processor 137 may send a request for the technician to bond the eight pair of service together.

Inventory processor 137 may report qualified service pair within cable 115 in, for example, the cable status system, the work order system, or the inventory system. Inventory processor 137 may report the available plurality of service pair by assigning a facility reservation number to the available plurality of service pair. In addition, inventory processor 137 may store the facility reservation number with, for example, the service order. Furthermore, reporting the available plurality of service pair may include marking each of the service pair with the assigned facility reservation number. For example, inventory processor 137 may assign the facility reservation number to the eight pair of service within cable 115, after the technician reports the completion of bonding the eight pair. Inventory processor 137 may report the facility reservation number to the work order system for future reference.

Once inventory processor 137 determines the available plurality of service pair equal to the facility requirement value are available in stage 320, method 300 may continue to stage 330 where inventory processor 137 may create a circuit tag corresponding to the available plurality of service pair. For example, inventory processor 137 may create a unique identifier configured to denote the use of the available plurality of service pair as one circuit. The unique identifier may denote a pre-determined purpose exists for the newly formed circuit. Furthermore, the unique identifier may extend the pre-determined purpose to the available plurality of service pair. Inventory processor 137 may establish an association between the circuit tag and each of the available plurality of service pair in, for example, the database, a server, the inventory system, an accounting system, or the cable status system. Inventory processor 137 may request that the technician physically attach the circuit tag to the available plurality of service pair including, for example, at service location 110 and at switching center 105.

For example, after reporting the facility reservation number for the eight pairs in cable 115, inventory processor 137 may create the circuit tag "MBE 001". "MBE" may denote the circuit with the pre-determined purpose of being a mid-band Ethernet circuit. In addition, inventory processor 137 may change the status of each of the eight pairs in cable 115 in the accounting system to identify the circuit with its new tag, "MBE 001". Inventory processor 137 may request the technician to place printed circuit tags, each with the circuit tag number "MBE 001", along the route of the eight pairs of cable 115.

After inventory processor 137 creates the circuit tag corresponding to the available plurality of service pair in stage 330, method 300 may proceed to stage 340 where inventory processor 137 may create a plurality of service tags corresponding to each of the available plurality of service pair. For example, after creating and properly storing the circuit tag MBE 001, inventory processor 137 may create the plurality of service tags. Each of the service tags may correspond respectively with each of the available plurality of the service pair. Furthermore, inventory processor 137 may sequentially identify the service tags. Each of the service tags may denote a predetermined purpose for each of the available plurality of service pair by associating each of the service tags with the circuit tag or by using a unique identifier in the service tag.

In creating the service tags, inventory processor 137 may respectively associate each service tag to the service pair within cable 115. Furthermore, inventory processor 137 may request that the technician physically attach the service tags to the available plurality of service pair including, for example, at service location 110 and at switching center 105. Inventory processor 137 may concatenate each of the service tags with the circuit tag, either prior to or after, the association of the service tag to the service pair within cable 115.

For example, after assigning the circuit tag "MBE 001" to all eight of the available plurality of service pair, inventory processor 137 may create sequential service tags, identified in the order that the service pair connects to source side cross-connect equipment 135. For example, the first pair, connected to source side cross-connect equipment 135, may get a service pair tag of "001". The second pair through the eighth pair may get similar respectively numbered tags "002-008". Then inventory processor 137 may concatenate the service tags with the circuit tag so the first pair becomes associated with, for example, "MBE 001 001". Each of the remaining seven pair may be associated with their respective concatenated service tags, the tags ranging from "MBE 001 002" to "MBE 001 008". Furthermore, inventory processor 137 may request the technician to place printed service tags along the route of cable 115, respectively attached to each tag's assigned service pair within cable 115.

After inventory processor 137 creates the plurality of service tags corresponding to each of the available plurality of service pair in stage 340, method 300 may proceed to stage 350 where inventory processor 137 may store the circuit tag and the plurality of service tags. Inventory processor 137 may associate each of the available plurality of the service pair, respectively represented by the service pair within cable 115, to each of the respective service tags for example, in a database, in the server, in the accounting system, in the inventory system, or in the cable status system. Furthermore, inventory processor 137 may concatenate the circuit tag and the service tags. Inventory processor 137 may associate the concatenated tag with the service pair within cable 115 and store the information. After associating the respective service tags to each of the available plurality of the service pair, inventory processor 137 may report the information to the technician, to service location 110, or to other interested parties. Furthermore, the inventory processor 137 may associate the available plurality of the service pair, respectively represented by the service pair within cable 115, in the inventory system using the circuit tag, the service tag, the concatenated circuit tag to the service tags, or some other combination as the inventory system may allow. For example, inventory processor 137 may change the status of each of the eight pair in cable 115, within the cable status system, in the accounting system and on the service order, to identify the eight pair of service pair within cable 115 with their respective new tags, MBE 001 001 through MBE 001 008. Inventory processor 137 may then store the newly inventoried service pair within the inventory system, using, for example, the circuit identifier, because for example, the inventory system may not accommodate the service tag identification. Once computing device 200 stores the circuit tag and the plurality of service tags in stage 350, method 300 may then end at stage 360.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for inventorying circuits, the method comprising:
    calculating a facility requirement value corresponding to a required number of service pairs required to serve a location with a predetermined service quality;
    determining that an available plurality of service pairs equal to the facility requirement value are available to the location;
    creating a circuit tag corresponding to the available plurality of service pairs;
    creating a plurality of service tags, each of the plurality of service tags respectively corresponding to each of the available plurality of service pairs, the plurality of service tags being sequential and including the circuit tag; and
    storing the circuit tag and the plurality of the service tags in an inventory database.

2. The method of claim 1, wherein calculating the facility requirement comprises:
    receiving a service order identifying the location; and
    selecting a switching center from a plurality of switching centers, the switching center being configured to provide service to the location, and being geographically closest to the location.

3. The method of claim 2, wherein the switching center comprises at least one of a telephone central office or a field switching center.

4. The method of claim 1, wherein calculating the facility requirement comprises:
    receiving a service order identifying the location and the predetermined service quality; and
    using a rate and a reach to determine the facility requirement value, the rate being based on the predetermined service quality and the reach being based on a distance between the location and a switching center configured to serve the location.

5. The method of claim 1, wherein calculating the facility requirement value corresponding to the required number of service pairs comprises calculating the facility requirement value corresponding to the required number of service pairs comprising at least one of twisted pairs within a cable or fiber optic strands.

6. The method of claim 1, wherein determining that the available plurality of service pairs equal to the facility requirement value are available to the location comprises:
    determining that the available plurality of service pairs are unused between the location and a switching center configured to serve the location; and
    determining the available plurality of service pairs are qualified.

7. The method of claim 6, wherein determining that the available plurality of service pairs are qualified comprises:
    verifying that each of the available plurality of service pairs is unused;
    determining that each of the available plurality of service pairs have been tested; and
    determining that the available plurality of service pairs are bonded.

8. The method of claim 1, wherein determining that the available plurality of service pairs equal to the facility requirement value are available to the location comprises:
    assigning a facility reservation number to the available plurality of service pairs; and
    storing the facility reservation number associated with a service order in the inventory database.

9. The method of claim 1, wherein creating the circuit tag comprises assigning a unique identifier configured to denote that the plurality of service pairs are used for a predetermined purpose.

10. The method of claim 1, wherein creating the plurality of service tags comprises assigning a unique identifier configured to denote that the plurality of service pairs are used for a predetermined purpose.

11. The method of claim 1, wherein creating the plurality of the service tags comprises:
    assigning respectively sequential numbers to each of the plurality of the service tags;
    identifying each of the plurality of the service tags as being used for a predetermined purpose; and
    associating each of the plurality of the service tags with the circuit tag.

12. The method of claim 1, wherein storing the circuit tag and the plurality of the service tags in the inventory database further comprises associating the circuit tag and the service tag with each of the plurality of the service pairs in the inventory database.

13. The method of claim 1, wherein storing the circuit tag and the plurality of the service tags in the inventory database further comprises associating the circuit tag with the plurality of the service pairs in the inventory database.

14. A system for inventorying circuits, the system comprising:
    a memory storage; and
    a processing unit coupled to the memory storage, wherein the processing unit is operative to:
    calculate a facility requirement value corresponding to a required number of service pairs required to serve a location with a predetermined service quality;
    determine that an available plurality of service pairs equal to the facility requirement value are available to the location;
    create a circuit tag corresponding to the available plurality of service pairs;
    create a plurality of service tags, each of the plurality of service tags respectively corresponding to each of the available plurality of service pairs, the plurality of service tags being sequential; and
    store the circuit tag and the plurality of the service tags in an inventory database.

15. The system of claim 14, wherein the processing unit is further operative to:
    receive a service order identifying the location; and
    select a switching center from a plurality of switching centers, the switching center being configured to provide service to the location, and being geographically closest to the location.

16. The system of claim 14, wherein the processing unit is further operative to:
    receive a service order identifying the location and the predetermined service quality; and
    use a rate and reach to determine the facility requirement value, the rate being based on the predetermined service quality and the reach being based on the distance between the location and a switching center configured to serve the location.

17. The system of claim 14, wherein the processing unit is further operative to associate the circuit tag with the plurality of the service pairs in the inventory database.

18. A computer-readable medium which stores a set of instructions which when executed performs a method for inventorying circuits, the method executed by the set of instructions comprising:

calculating a facility requirement value corresponding to a required number of service pairs required to serve a location with a predetermined service quality;

determining that an available plurality of service pairs equal to the facility requirement value are available to the location;

creating a circuit tag corresponding to the available plurality of service pairs;

creating a plurality of service tags, each of the plurality of service tags respectively corresponding to each of the available plurality of service pairs, the plurality of service tags being sequential and including the circuit tag; and storing the circuit tag and the plurality of the service tags in an inventory database.

19. The computer-readable medium of claim 18, wherein calculating the facility requirement value comprises:

receiving a service order identifying the location; and selecting a switching center from a plurality of switching centers, the switching center being configured to provide service to the location, and being geographically closest to the location.

20. The computer-readable medium of claim 18, wherein storing the circuit tag and the plurality of the service tags in the inventory database further comprises associating the circuit tag with the plurality of the service pairs in the inventory database.

* * * * *